(12) United States Patent
Ohmi et al.

(10) Patent No.: US 8,253,894 B2
(45) Date of Patent: Aug. 28, 2012

(54) OPTICAL ELEMENT, ILLUMINATION DEVICE AND DISPLAY DEVICE

(75) Inventors: Motosuke Ohmi, Tokyo (JP); Hiromasa Suzuki, Tokyo (JP); Kanji Yokomizo, Kanagawa (JP)

(73) Assignee: Sony Corporation, Tokyo (JP)

( * ) Notice: Subject to any disclaimer, the term of this patent is extended or adjusted under 35 U.S.C. 154(b) by 283 days.

(21) Appl. No.: 12/783,184

(22) Filed: May 19, 2010

(65) Prior Publication Data
US 2010/0302477 A1    Dec. 2, 2010

(30) Foreign Application Priority Data
May 26, 2009    (JP) ................................ 2009-126486

(51) Int. Cl.
*G02F 1/1335*    (2006.01)
*G02F 1/1333*    (2006.01)

(52) U.S. Cl. ............. 349/106; 349/110; 349/61; 349/65
(58) Field of Classification Search .................... 349/61, 349/65, 106, 110
See application file for complete search history.

(56) References Cited

U.S. PATENT DOCUMENTS

| | | | |
|---|---|---|---|
| 6,345,899 B1 * | 2/2002 | Ohkawa et al. ............... | 362/611 |
| 6,827,458 B2 * | 12/2004 | Suga ............................. | 362/609 |
| 7,690,819 B2 * | 4/2010 | Seo ............................... | 362/326 |

FOREIGN PATENT DOCUMENTS

JP    2008-108623    5/2008

* cited by examiner

*Primary Examiner* — James Dudek
(74) *Attorney, Agent, or Firm* — K&L Gates LLP (57) ABSTRACT

An optical element for an illumination device, an illumination device, and a display device using the illumination device is capable of performing surface light emission by utilizing a plurality of light guide members, and suppressing generation of color unevenness.

26 Claims, 9 Drawing Sheets

OPTICAL ELEMENT, ILLUMINATION DEVICE AND DISPLAY DEVICE

CROSS REFERENCES TO RELATED APPLICATIONS

The present application claims priority to Japanese Priority Patent Application JP 2009-126486 filed on May 26, 2009, the entire contents of which is hereby incorporated by reference.

BACKGROUND

The present disclosure relates to an illumination device using a light guide plate, and a display device including the same.

Typically, a liquid crystal display (LCD) used in various electronic devices such as a television, a cellular phone, a notebook PC (personal computer), and a digital camera includes a backlight illuminating a liquid crystal panel. As a backlight, for example, a light source module in which a light emitting diode (LED) is provided on a side face of a light guide plate is used. As the LED, an LED chip emitting white light is mounted on a package of heat-resistant polymer, ceramic, or the like, and used in many cases.

In recent years, by arranging such a plurality of light source modules side by side, an illumination device adaptable to a large screen size, and a so-called partial drive method has been proposed (for example, Japanese Unexamined Patent Publication No. 2008-108623).

Here, in the light source module using the LED as described above, surface light emission is performed by allowing the white light to enter inside the light guide plate from the LED, and extracting this white light from one face (light emission face) of the light guide plate. However, at that time, a part of the light emitted from the LED chip is leaked from the package side, and is emitted to the top part of the LED as it is without entering inside the light guide plate. Such leak light becomes a color light which is somewhat yellowish by transmitting the package. Thus, the yellowish light is mixed into the white light emitted from the light emission face of the light guide plate correspondingly to the arrangement place of the LED.

In the liquid crystal display for mobile applications such as a cellular phone, since the screen size is small, the light source module is used alone in many cases. Thus, the LED is arranged outside (in a frame of) a display screen, and the leak light from the LED is shielded in the frame. Thus, in the case where the light guide plate is used alone, the influence by the leak light as described above is particularly not an issue.

However, like the illumination device of Japanese Unexamined Patent Publication No. 2008-108623, in the configuration in which a plurality of light source modules are arranged side by side, the LED is disposed close to a boundary of the light guide plates. That is, the LED is arranged in a local region in the display screen. Thus, in the illumination device using a plurality of light guide plates, there is an issue that color unevenness as described above is generated close to the boundary of the light guide plates.

In view of the foregoing, it is desirable to provide an illumination device capable of performing a surface light emission by utilizing a plurality of light guide members, and suppressing generation of color unevenness, and a display device using the same.

SUMMARY

According to the illumination device of an embodiment, it is possible to perform color correction of the leak light whose color is changed by transmitting the package member or the like of the light source. Thus, it is possible to perform surface light emission by utilizing the plurality of light guide members, and it is possible to suppress generation of color unevenness. Thereby, according to the display device of the embodiment, it is possible to display an image in which deterioration of image quality is small.

In an embodiment, an optical element for an illumination device is provided. The optical element includes a light shielding layer having a degree of transmittance, and a color sheet provided on the light shielding layer. The color sheet has a color that is complimentary to a color of light emitted from a light source and that varies from white light. The color sheet alters the color of light emitted from the light source to reduce a difference between the color of the light source and white light as light is transmitted through the color sheet and the light shielding layer.

In an embodiment of the optical element, the light source is a plurality of light-emitting diodes, and the color sheet and light shielding layer are common to the plurality of the light-emitting diodes. In another embodiment of the optical element, the light source is positioned adjacent to an edge of at least one light guide plate, and light is transmitted from the light source to the light guide plate and the color sheet.

In another embodiment, an illumination device is provided and includes a light guide plate, an optical element including a complimentary color sheet, a light shielding layer provided on the complimentary color sheet, and a light source. The light source emits a first light component into the light guide plate and emits a second light component into the optical element, the second light component having a different color than the first light component. The complimentary color sheet has a color that is complimentary to the color of the second light component, and the complimentary color sheet alters the color of the second light component so that light transmitted through the complimentary color sheet and the light shielding layer is emitted therefrom with a color that is substantially similar to the color of the first light component that is emitted from the light guide plate.

In an embodiment of the illumination device, the color of the first light component is white light, and the second light component varies from white light after being transmitted through at least a portion of the package. In another embodiment of the illumination device, the light source is positioned adjacent to an edge of the light guide plate, and the optical element is positioned above the light source. In another embodiment, the light source includes a plurality of light-emitting diodes emitting white light that are arranged along the edge of the light guide plate. In another embodiment, the complimentary color sheet includes a plurality of discrete portions corresponding to each of the plurality of light-emitting diodes, each portion positioned above the respective light-emitting diode.

In another embodiment, a display device is provided. The display device includes a liquid crystal panel, and an illumination device configured to illuminate the liquid crystal panel. The illumination device includes an array of light guide plates, a plurality of light sources arranged at one or more edges of each of the light guide plates, and optical elements positioned above at least a portion of the light sources. At least one optical element includes a complimentary color sheet, and a light shielding layer provided on the complimentary color sheet. At least one light source emits a first light component into the respective light guide plate and emits a second light component into the respective optical element, the second light component varies from white light and has a different color than the first light component. The complimentary color sheets have a color that is complimentary to the color of the second light component, and at least one complimentary color sheet alters the color of the second light component to reduce a difference between the color of the second light component and white light as the second light component is transmitted through the complimentary color sheet and the light shielding layer.

In one embodiment of the display device, at least one optical element is common to a plurality of light sources. In another embodiment, at least one optical element is common to a plurality of light guide plates. In a further embodiment, the optical element that is common to a plurality of light guide plates has a stripe shape and is positioned at a boundary between adjacent rows or columns of light guide plates.

In another embodiment of the display device, a first light source includes a plurality of light-emitting diodes and is positioned at a first edge of a first light guide plate, and a second light source includes a plurality of light-emitting diodes and is positioned at a second edge of a second light guide plate that is adjacent to the first light guide plate. Also, the first and second light sources are positioned adjacent to one another between the adjacent first and second light guide plates, and emit light in opposite directions into their respective light guide plates. In an embodiment, one optical element is common to at least the first and second light sources.

Additional features and advantages are described herein, and will be apparent from the following Detailed Description and the figures.

DETAILED DESCRIPTION

Embodiments will be hereinafter described in detail with reference to the drawings. The description will be made in the following order:

1. Embodiment: a case of an illumination device in which a complementary color sheet and a light shielding sheet are stacked so as to cover a gap between light guide plates 2. Modification: an example where the complementary color sheet is provided for each LED 3. Application example: an example of a display device in which the illumination device is used as a backlight.

1. Embodiment

Configuration of Illumination Device 1

Figure 1:
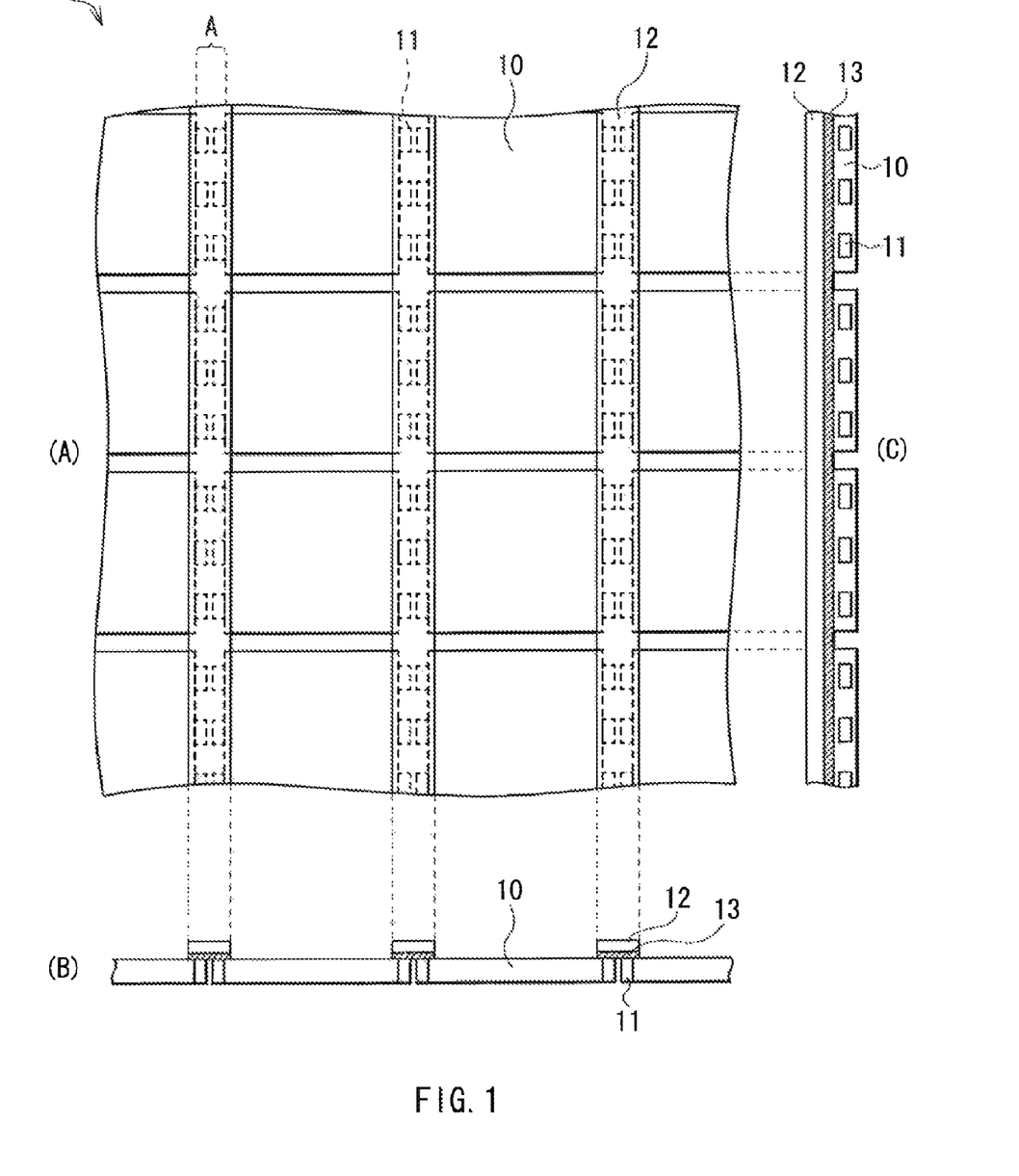
FIG. 1 is a plan view and side face view illustrating the schematic configuration of an illumination device according to an embodiment.

Part A of FIG. 1 illustrates the plan configuration of an illumination device (illumination device 1) according to an embodiment, and part B and part C of FIG. 1 illustrate the side face configuration, respectively. The illumination device 1 is, for example, used as a backlight of a display device such as a liquid crystal display, and is formed, for example, by two-dimensionally aligning a plurality of light guide plates 10 on the same plane. In a gap A between the light guide plates 10 adjacent to each other, an LED 11 as a light source is disposed. In this embodiment, a complementary color sheet (layer) 13 is provided so as to cover the gap A on the LED 11. Moreover, on the complementary color sheet 13, a light shielding sheet (layer) 12 is provided. The complementary color sheet 13 and the light shielding sheet 12 constitute an optical element of the illumination device. Hereinafter, the specific configuration of each part will be described.

The light guide plate 10 is an optical member in the shape of a flat plate to propagate and guide light to a light emission face. Examples of a material for the light guide plate 10 include a transparent material such as polycarbonate and acrylic. The planar shape of each light guide plate 10 is a square, and the LEDs 11 are disposed by one or more (here, three) on the side faces of two facing sides of the square. In each light guide plate 10, for example, the top face is the light emission face, and a reflection sheet (not illustrated in the figure) for diffuse reflection is provided on the bottom face. Thereby, in the light guide plate 10, the light entering from the side face is guided to the light emission face by lighting the LED 11. In addition, the planar shape of the light guide plate 10 may be the square, or a rectangular.

The LED 11 is, for example, a light emitting diode emitting white light, and mounted, for example, on a package in which a diode chip is formed of heat-resistant polymer, ceramic, or the like. The LED 11 is disposed on the side face of the light guide plate 10 so that the light emission face of the diode chip is directed inside the light guide plate 10, and a package part is exposed to outside the light guide plate 10, that is, the gap A between the light guide plates 10. The LED 11 is, for example, mounted on a circuit board of a flexible printed circuit (FPC) not illustrated in the figure or the like, and is switched to turn on and turn off in response to the control of a drive circuit section not illustrated in the figure. Here, although the description has been made with the example of the case where the three LEDs 11 are provided on the one side face of the light guide plate 10, the number, the arrangement gap, and the like of the LED 11 is not specifically limited, and may be appropriately set according to the necessary light amount, the size of the light guide plate 10, or the like.

The light shielding sheet 12 is intended to suppress a local increase of the luminance (generation of emission lines) due to leak light from the LED 11. However, in this embodiment, the light shielding sheet 12 does not completely shield the leak light from the LED 11, and has the light transmittance to some degree. Such a light shielding sheet 12 is, for example, a white reflection sheet (PET: polyethylene terephthalate) having a thickness of 100 μm.

The complementary color sheet 13 performs color correction of the leak light from the LED 11, and is a sheet colored with a color complementary to the color of the leak light and having the light transmittance. Specifically, the leak light from the LED 11 is a yellowish light, and thus a sheet colored with blue is used as the complementary color sheet 13. Examples of a material for the sheet include polyethylene, polypropylene, polyester, or the like. In this embodiment, the complementary color sheet 13 is provided as a common sheet for a plurality of LEDs 11 aligned along the gap A (part C of FIG. 1). Therefore, the combination of the complimentary color sheet 13 and the light shielding sheet 12 constitute an optical element of the illumination device, as they have dual optical functionalities of color correction and light shielding, respectively.

(Operations and Effects of the Illumination Device 1)

Figure 2:
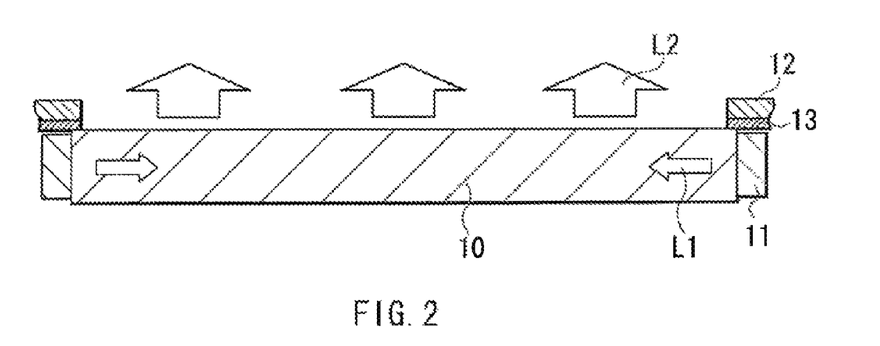
FIG. 2 is a schematic view illustrating the state of surface light emission of the illumination device illustrated in FIG. 1.

Next, operations and effects of this embodiment will be described. FIG. 2 schematically illustrates the state of the surface light emission in one light guide plate 10 illustrated in FIG. 1. As illustrated in FIG. 2, in this embodiment, light L1 entering inside the light guide plate 10 from the LED 11 is extracted as illumination light L2 from the top face (light emission face) of the light guide plate 10 while being repeatedly reflected in the light guide plate 10 and propagated. Thereby, the surface light emission is generated in the illumination device 1.

However, meanwhile, the light emitted outside the light guide plate 10 without entering inside the light guide plate 10 from the LED 11 (leak light) is generated. This leak light is light emitted from the LED chip and partly leaked from the package side, and is emitted to the top part of the LED 11 as it is. Such leak light becomes yellowish color light by transmitting the package of the LED 11.

Figure 3:
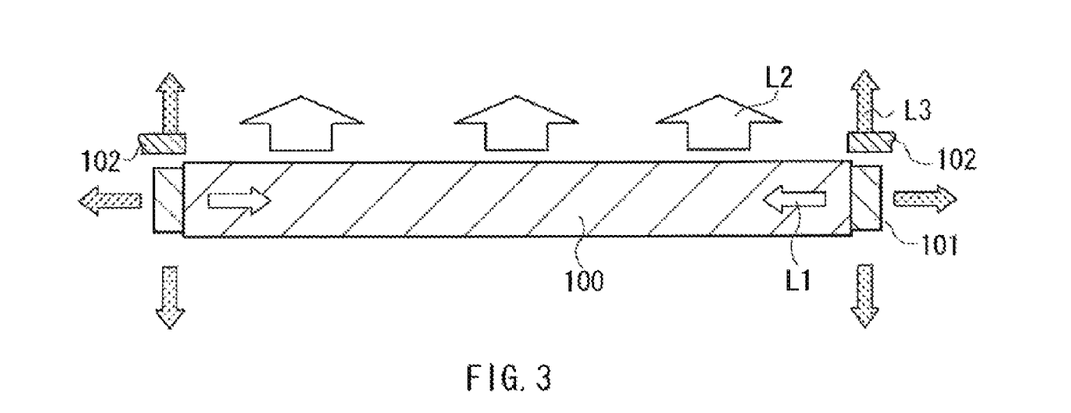
FIG. 3 is a schematic view illustrating the state of the surface light emission of an illumination device according to a comparative example.

Here, as a comparative example of this embodiment, surface light emission in the case where the complementary color sheet is not provided will be described. FIG. 3 schematically illustrates the state of the surface light emission in one light guide plate 100 of an illumination device according to the comparative example. In the comparative example, the configuration is the same as the configuration of the illumination device 1 of this embodiment except that the complementary color sheet is not provided in the comparative example. That is, an LED 101 is disposed in a gap between a plurality of light guide plates 100 which are two-dimensionally aligned, and a light shielding sheet 102 having the light transmittance is provided immediately on the gap.

In the comparative example, the leak light (L3) as described above is emitted as illumination light as it is, and thus the yellowish leak light (L3) is mixed in the white illumination light L2 emitted from the light emission face of the light guide plate 100 correspondingly to the arrangement place of the LED 101. Therefore, the color unevenness is generated close to the boundary of the light guide plates 100.

Figure 4:
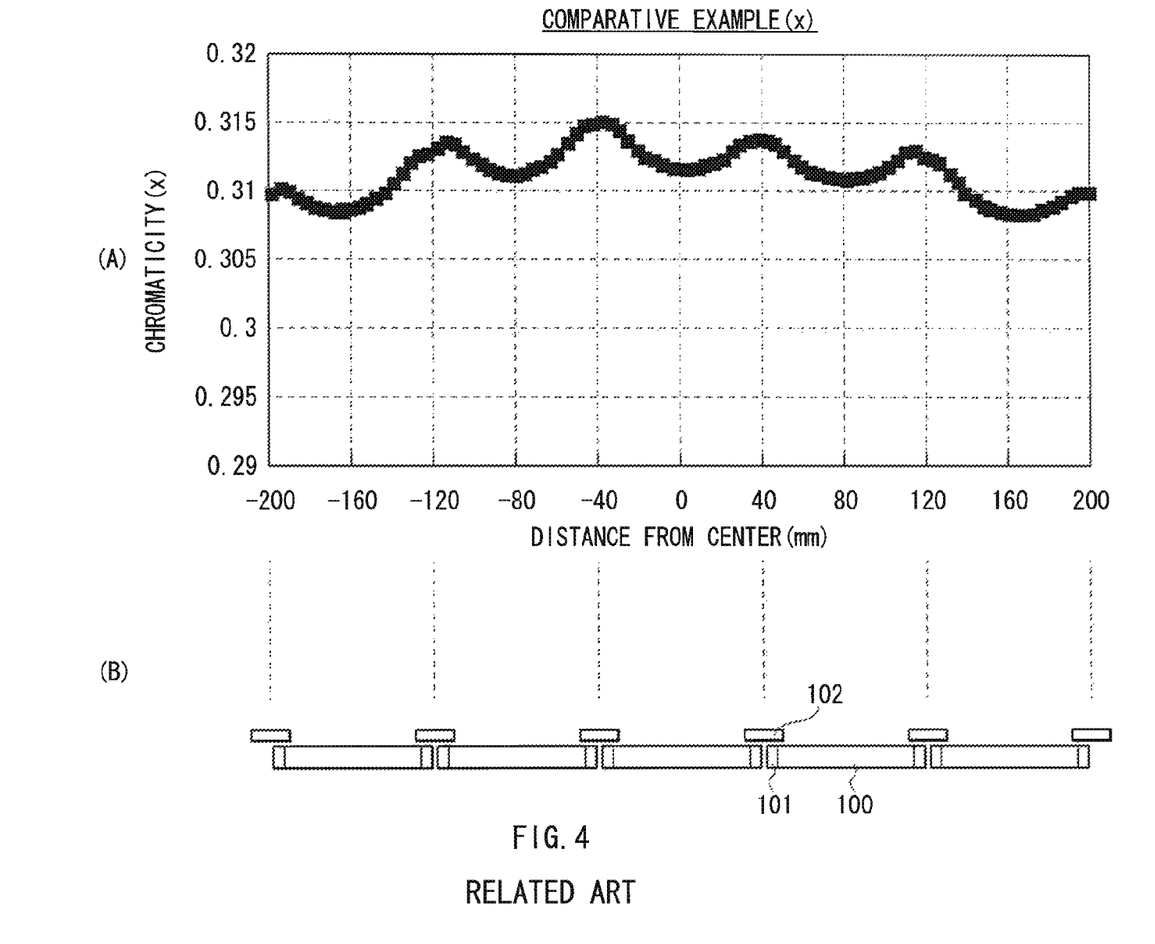
FIG. 4 is a characteristic view illustrating chromaticity (x) of the illumination device according to the comparative example.
Figure 5:
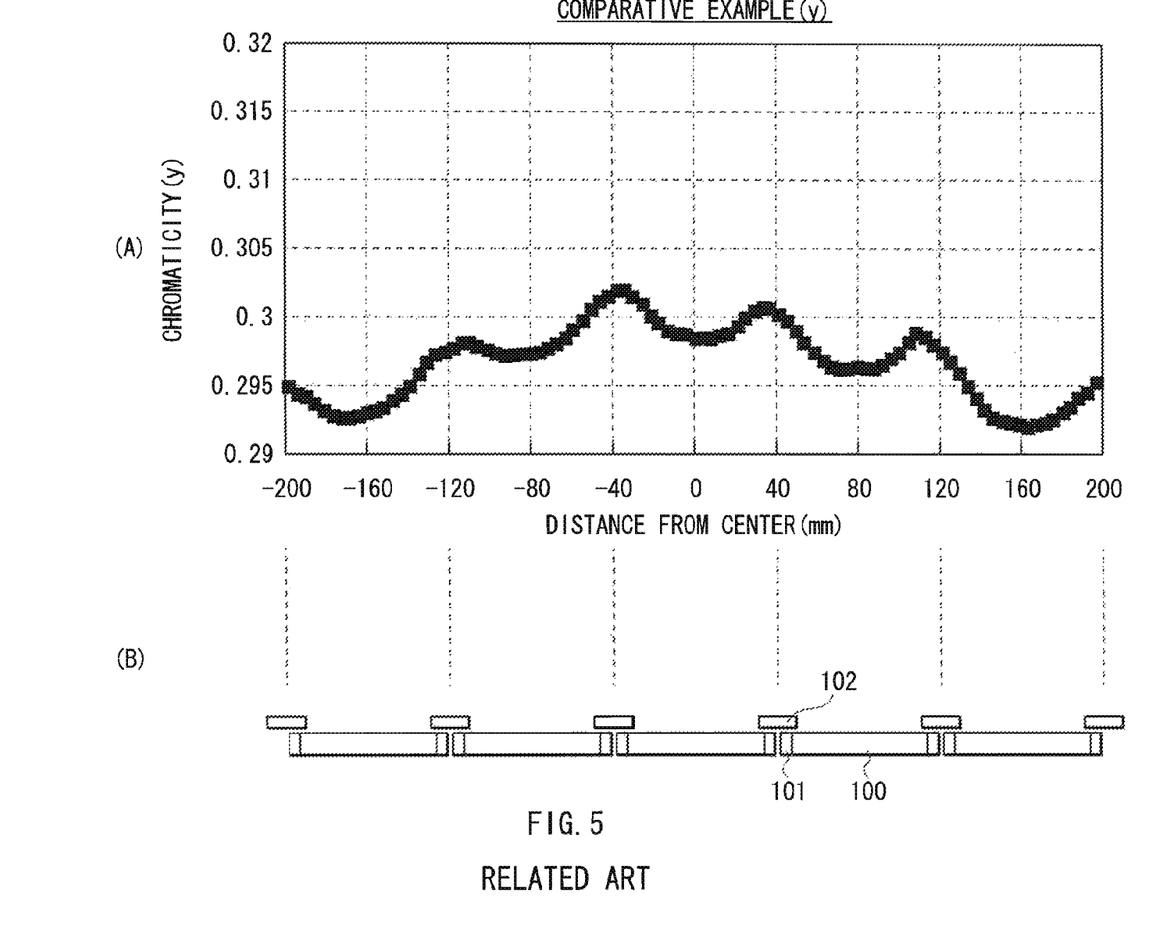
FIG. 5 is a characteristic view illustrating chromaticity (y) of the illumination device according to the comparative example.

For example, here, part A of FIG. 4 illustrates the chromaticity (x) of illumination light in the case where the complementary color sheet is not provided as in the comparative example. At this time, as illustrated in part B of FIG. 4, five light guide plates 100 are aligned side by side in one direction, the LED 101 is disposed in the gap between the light guide plates 100, and a light shielding sheet 102 is provided immediately on that gap. Part A of FIG. 5 illustrates the chromaticity (y) of the illumination light in the same case. In this manner, in the configuration in which the complementary color sheet is not provided, it is understood that both the chromaticity (x) and the chromaticity (y) increase by approximately 0.005 close to the boundary of the light guide plates 100. In particular, in the case where such a chromaticity change is existed continuously along one direction, the chromaticity change is recognized as the color unevenness even by naked eyes.

On the other hand, in this embodiment, the complementary color sheet 13 colored with blue which is a complementary color of yellow is provided on the LED 11. Thereby, the yellowish leak light as described above is corrected in color by passing through the complementary color sheet 13, and is emitted as the white light from the complementary color sheet 13. Accordingly, it is possible to obtain the white light without the color unevenness in the whole illumination light.

Figure 6:
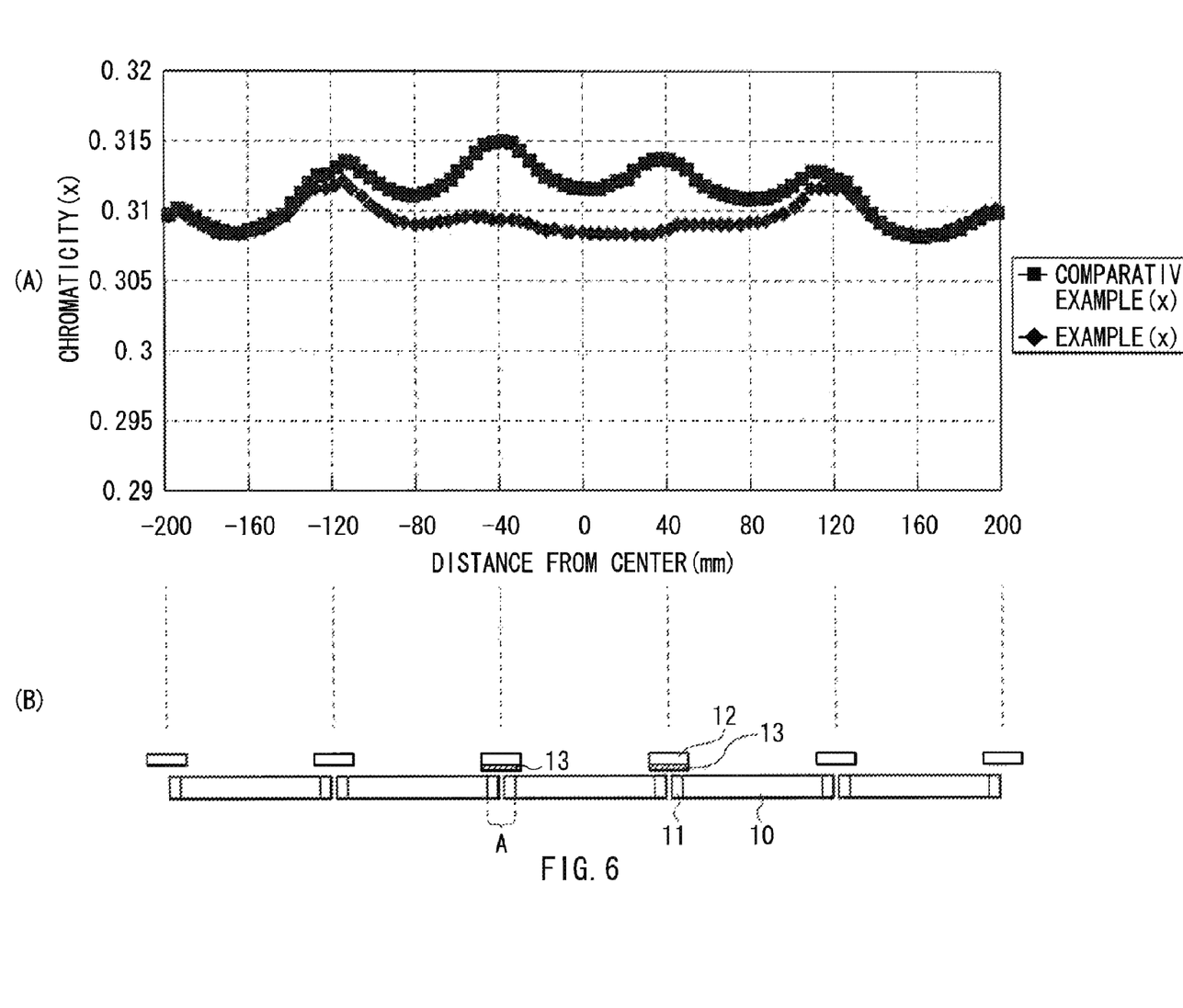
FIG. 6 is a characteristic view illustrating chromaticity (x) of the illumination device according to an example.
Figure 7:
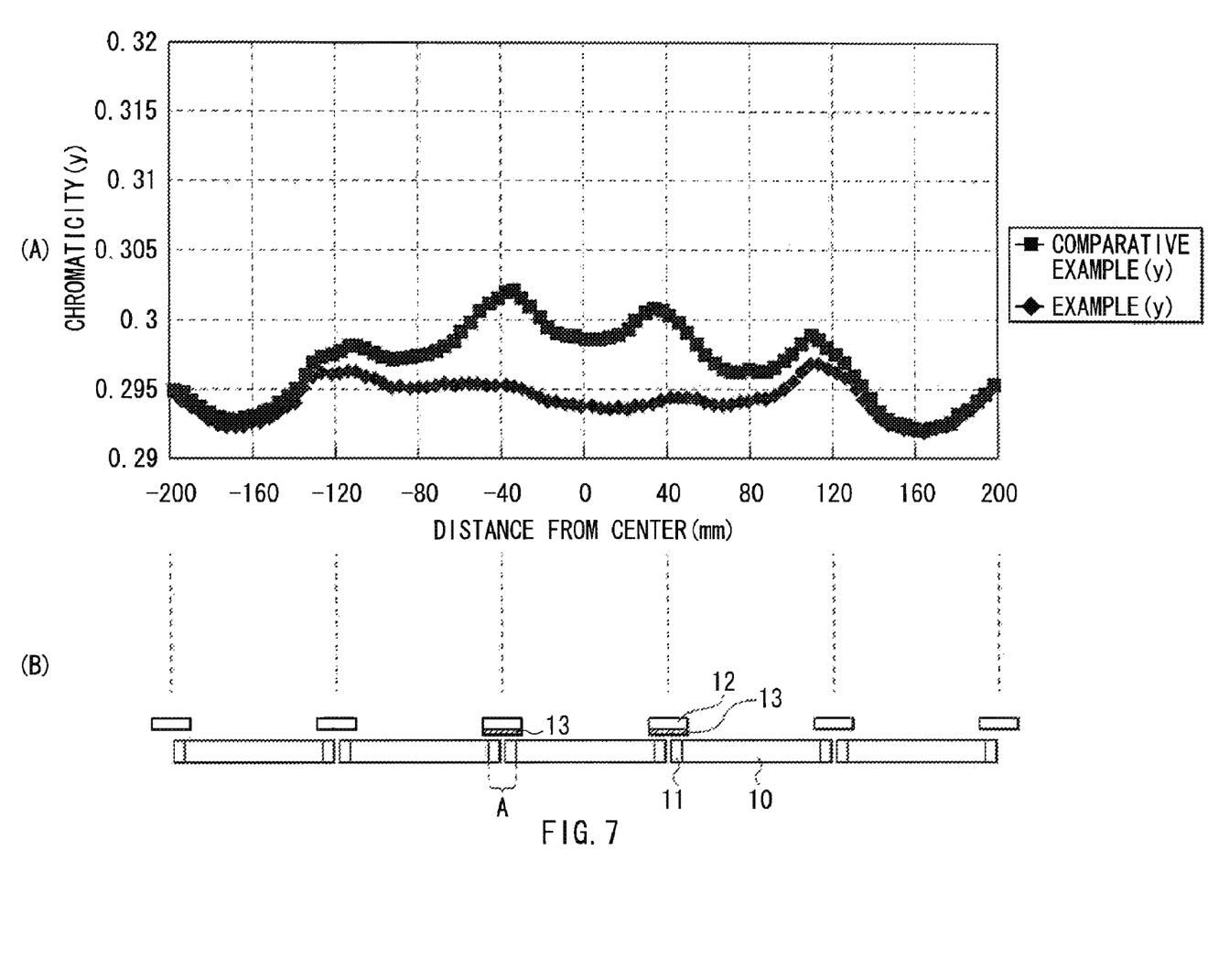
FIG. 7 is a characteristic view illustrating chromaticity (y) of the illumination device according to the example.

For example, in part A of FIG. 6, the chromaticity (x) of the illumination light is illustrated as an example of this embodiment. At this time, as illustrated in part B of FIG. 6, five light guide plates 10 are aligned side by side in one direction, and the LED 11 is disposed in the gap A between the light guide plates 10. The complementary color sheet 13 and the light shielding sheet 12 are provided in this order on the LED 11 so as to cover the gap A. However, the complementary color sheet 13 is disposed only in two places (each of positions of +40 mm and −40 mm from the center) close to the center. In part A of FIG. 7, the chromaticity (y) of the illumination light in the same case is illustrated. In both the figures, the chromaticity in the comparative example illustrated in FIG. 5 is also illustrated for comparison. As illustrated in part A of FIG. 6 and part A of FIG. 7, both the chromaticity (x) and the chromaticity (y) in the place where the complementary color sheet 13 is provided do not increase, that is, it is understood that the color unevenness is improved.

As described above, in this embodiment, in the case where the plurality of light guide plates 10 are arranged on the same plane, and the LED 11 is disposed in the gap A between the light guide plates 10 adjacent to each other, the complementary color sheet 13 is provided on this LED 11. Accordingly, the leak light leaked from the package side of the LED 11, and having the yellowish color may be corrected in color and emitted. Thus, it is possible to emit the white light without the color unevenness close to the boundary of the light guide plates 10. Therefore, it is possible to perform the surface light emission by utilizing the plurality of light guide plates, and it is possible to suppress the color unevenness. Thereby, it is possible to realize the backlight suitable, in particular, for a large display device, and a display device utilizing the partial drive method.

Figure 8:
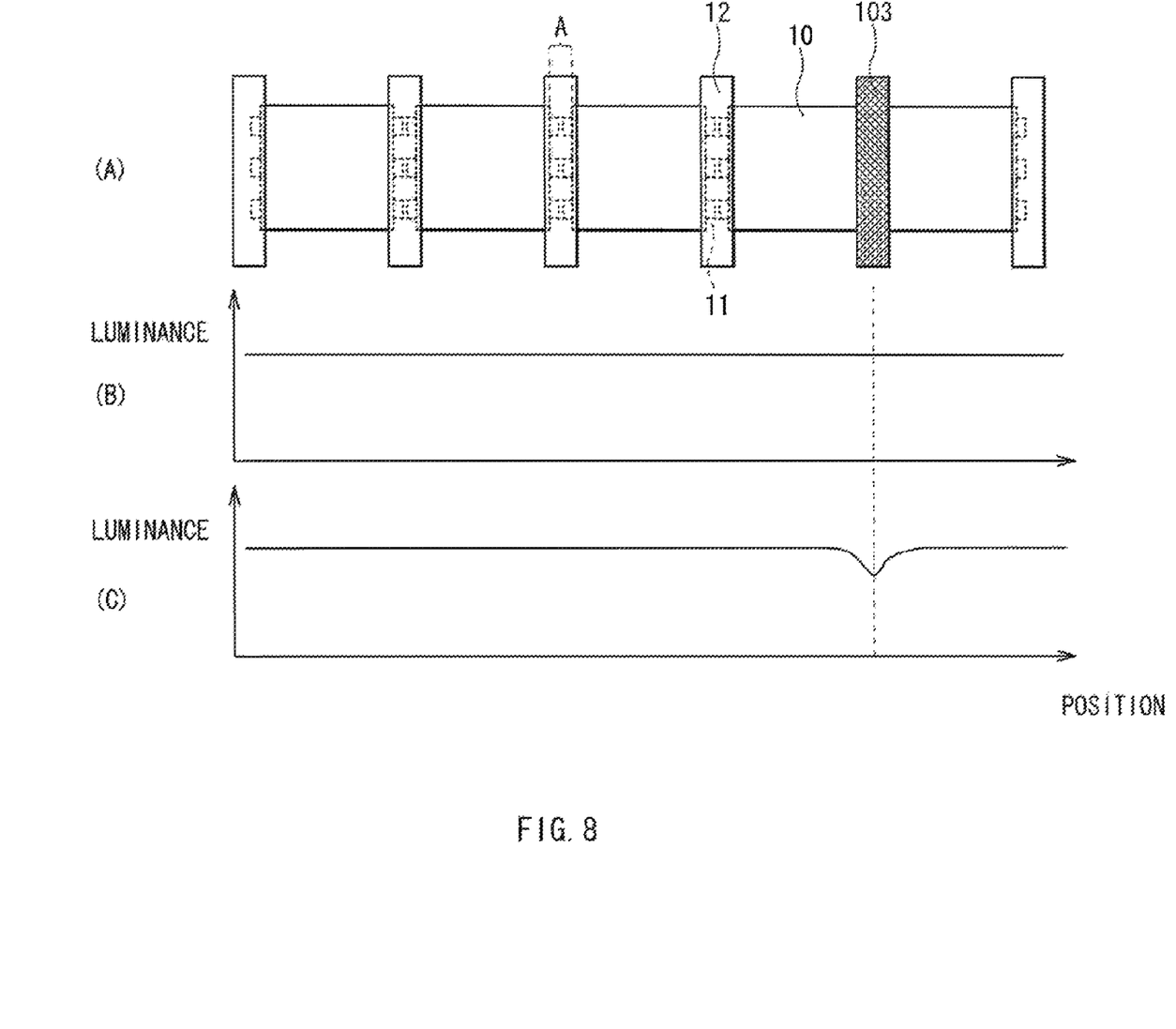
FIG. 8 is a view for explaining a luminance distribution in the case where a complete light shielding sheet is used.

When the light shielding sheet 12 does not completely shield the light, and has the light transmittance, it is possible to uniformize the luminance of the whole illumination device 1. Here, as illustrated in part A of FIG. 8, in the configuration in which the light guide plates 10 are aligned in one direction, and the LED 11 is disposed in the gap A, the case where a complete light shielding sheet 103 completely shielding the light is provided only in one place, and the light shielding sheets 12 are provided in other places will be considered. In this case, as illustrated in part C of FIG. 8, although the luminance reduction is not seen in the position corresponding to the position of the light shielding sheet 12 having the light transmittance, the luminance is reduced in the position corresponding to the position of the complete light shielding sheet 103, and thereby it is difficult to form the uniform luminance distribution. Therefore, by using the light shielding sheet 12 having the light transmittance, it is possible to obtain the uniform luminance distribution in the whole area of the illumination device 1 as illustrated in part B of FIG. 8.

In the illumination device 1, various types of optical films may be provided on (light emission side) the light guide plate 10. Examples of the optical film include a diffusion plate, a diffusion film, a lens film, and a reflective polarizing film. By such an optical film, the in-plane luminance distribution and the emission angle of the light emitted from the light guide plate 10 are adjusted, and it is possible to form the illumination light as the backlight.

2. Modification

Figure 9:
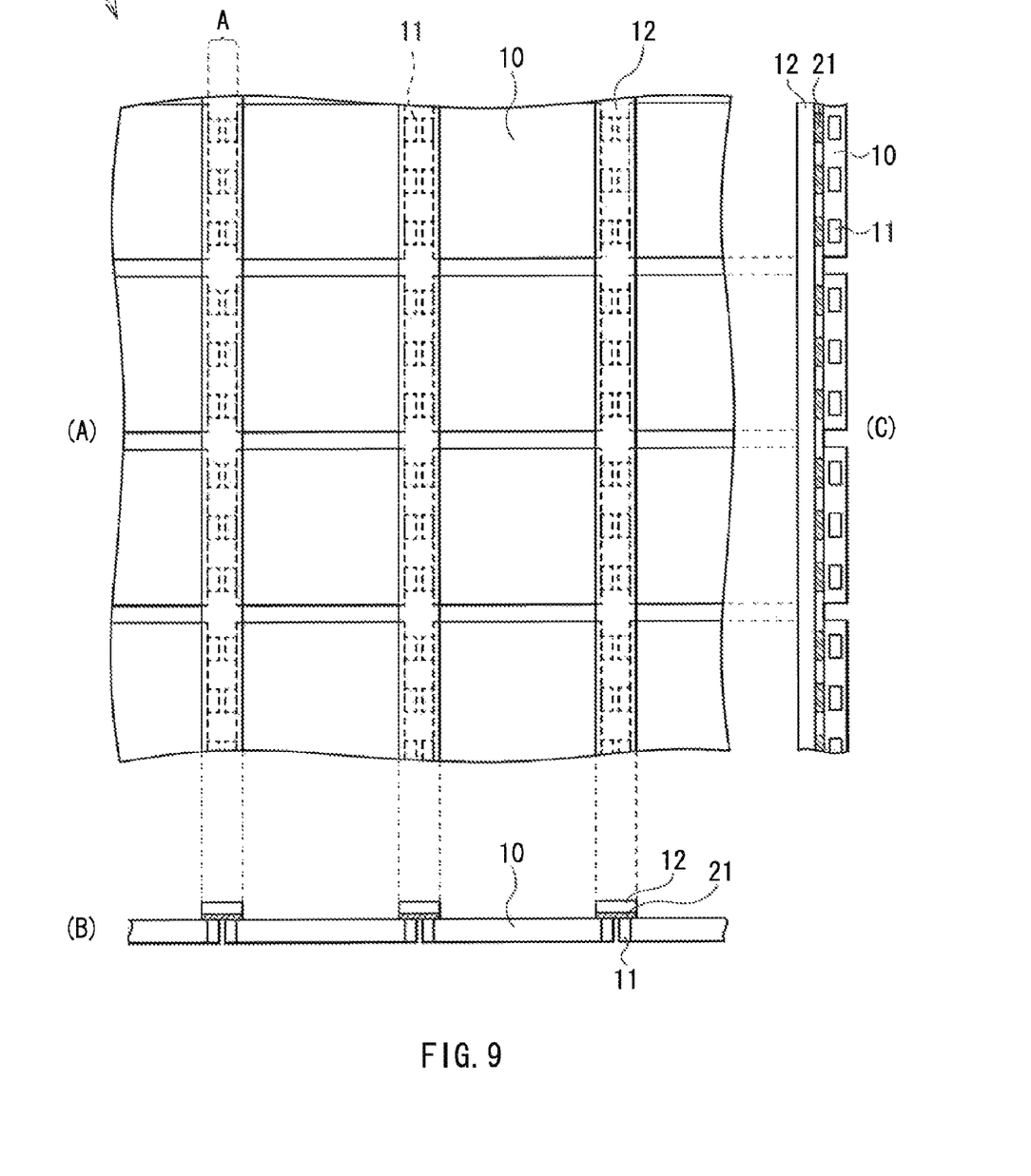
FIG. 9 is a plan view and a side face view illustrating the schematic configuration of the illumination device according to a modification.

Next, a modification of the above embodiment will be described. Part A of FIG. 9 illustrates the plan configuration of the illumination device (illumination device 2) according to the modification, and part B and part C of FIG. 9 illustrate the side face configuration, respectively. Same reference numerals as in the above embodiment will be used to indicate identical components, and thereby the description will be appropriately omitted.

In this modification, in the gap A, a complementary color sheet 21 is provided only immediately on the LED 11. That is, the complementary color sheet 21 is thinned and provided for each LED 11. Like the complementary color sheet 13 of the above embodiment, the complementary color sheet 21 performs the color correction of the leak light from the LED 11, and is the sheet colored with the color (for example, blue) complementary to the color of the leak light.

In this manner, the complementary color sheet 21 may be thinned in the gap A as long as the complementary color sheet 21 is provided on the LED 11. Even in this case, it is possible to obtain the same effects as the above embodiment.

3. Application Example

The illumination devices (illumination devices 1 and 2) according to the above embodiment and the above modification are suitably used, for example, for a display device 3 as will be described next. However, the description will be hereinafter made with an example of the illumination device 1.

Figure 10:
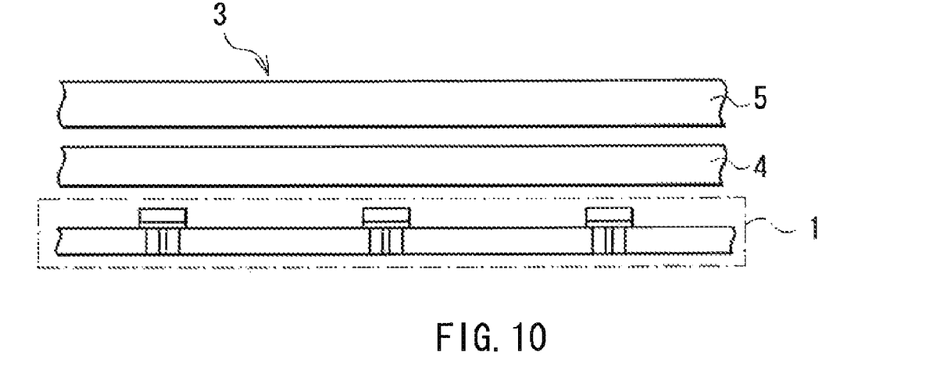
FIG. 10 is a view illustrating the stacked structure of a display device according to an application example.
Figure 11:
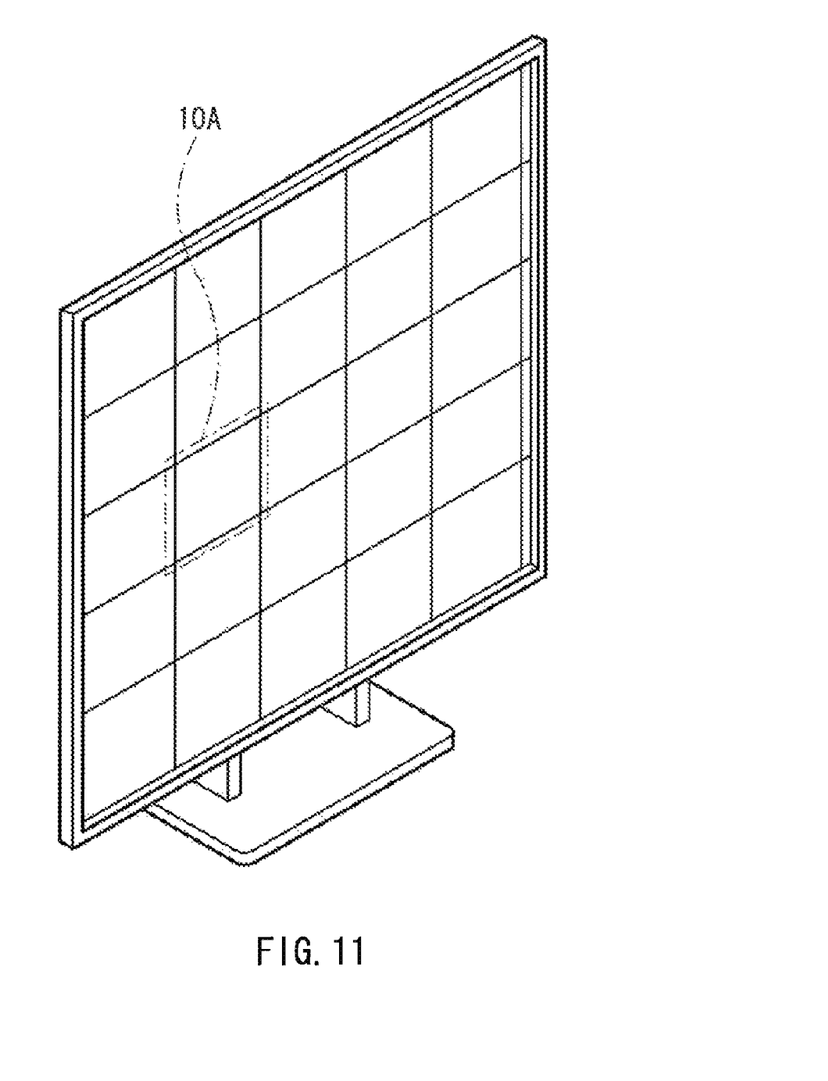
FIG. 11 is a perspective view illustrating the schematic configuration of the display device illustrated in FIG. 10.

FIG. 10 illustrates the stacked structure of the display device 3. FIG. 11 is a perspective view illustrating the display device 3 so as to illustrate its internal configuration (illumination device 1 part). The display device 3 is, for example, a liquid crystal display, and includes an optical function layer 4 and a liquid crystal panel 5 in this order on the illumination device 1 as a backlight. The optical function layer 4 is formed by stacking the diffusion plate, the diffusion film, the lens film, the reflective polarizing film, or the like. The liquid crystal panel 5 is formed, for example, by sealing liquid crystal of VA (vertical alignment) mode, TN (twisted nematic) mode, IPS (in-plane switching) mode or the like between a pair of substrates.

In such a display device 3, the LED 11 in the illumination device 1 is lighted by the control of the drive circuit section not illustrated in the figure, and an image is displayed in the liquid crystal panel 5 by modulating the illumination light from the illumination device 1 based on an image signal. As described above, since the color unevenness is suppressed in the illumination light irradiated from the illumination device 1, it is possible to obtain favorable display image quality. Moreover, as illustrated in FIG. 11, the illumination device 1 is adaptable to the large liquid crystal display by arranging the plurality of light guide plates 10 side by side. It is possible to drive and control (partial drive control) light-on and light-off of each region divided by the plurality of light guide plates 10 in the illumination device 1.

In the above embodiment, although the description has been made with the example of the complementary color sheet 13 provided separately from the LED 11 and the light shielding sheet 12, the present invention is not limited to such a sheet. For example, the complementary color sheet 13 and the light shielding sheet may be integrally formed by directly coloring the rear face (or the surface) of the light shielding sheet 12 with printing and painting.

In the above embodiment, although the description has been made with the example of the case where the light shielding sheet 12 is provided on the complementary color sheet 13, it is not limited to this. The complementary color sheet 13 may be provided on the light shielding sheet 12. However, since the complementary color sheet 13 is, for example, colored with blue, it is better to arrange the complementary color sheet 13 on the LED 11 side in comparison with the light shielding sheet 12. This is because when the complementary color sheet 13 is arranged outside in comparison with the light shielding sheet 12, the blue color is noticeable.

Moreover, in the above embodiment, the description has been made with the example of the case where the light guide plate is in the shape of the flat plate, and its planar shape is a square. However, it is not limited to this, and the planar shape may be a rectangular. Its shape is not limited to the shape the flat plate, and may be the shape of a wedge or the like.

In addition, in the above embodiment, although the description has been made with the example of the configuration in which the light guide plate is two-dimensionally arranged, the arrangement configuration of the light guide plate is not limited to this. For example, the plurality of light guide plates may be aligned only in one direction as long as they are arranged on the same plane.

Moreover, in the above embodiment, although the description has been made with the example of the case where the LED is disposed on the two side faces facing each other in the light guide plate, the face on which the LED is disposed is not limited to this. That is, for example, the LED may be arranged only on one side face of the light guide plate, or may be disposed on all four side faces. Even in these cases, when the complementary color sheet 13 is provided corresponding to the arrangement place of the LED, the effects same as in the present invention may be obtained.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical element for an illumination device, the optical element comprising:
   a light shielding layer having a degree of transmittance; and
   a color sheet provided on the light shielding layer and having a color that is complimentary to a color of light emitted from a light source,
   wherein the color of the light source varies from white light, and the color sheet alters the color of light emitted from the light source to reduce a difference between the color of the light source and white light as light is transmitted through the color sheet and the light shielding layer.

2. The optical element of claim 1, wherein a material of the color sheet includes polyethylene, polypropylene, or polyester.

3. The optical element of claim 1, wherein the light shielding layer is a white reflection sheet including polyethylene.

4. The optical element of claim 1, wherein the color of light emitted from the light source has a yellowish tint, and a color of the color sheet is blue.

5. The optical element of claim 1, wherein the color sheet and the light shielding layer are integrally formed by coloring a surface of the light shielding layer by a printing or painting method, and the surface of the light shielding layer upon which the color sheet is formed is adjacent to the light source.

6. The optical element of claim 1, wherein the light source includes at least one light-emitting diode emitting white light and is mounted on a package.

7. The optical element of claim 6, wherein the light source is a plurality of light-emitting diodes, and the color sheet and light shielding layer are common to the plurality of the light-emitting diodes.

8. The optical element of claim 1, wherein the light source is positioned adjacent to an edge of at least one light guide plate, and light is transmitted from the light source to the light guide plate and the color sheet.

9. An illumination device comprising:
a light guide plate;
an optical element including a complimentary color sheet, and a light shielding layer provided on the complimentary color sheet; and
a light source emitting a first light component into the light guide plate and emitting a second light component into the optical element, the second light component having a different color than the first light component,
wherein the complimentary color sheet has a color that is complimentary to the color of the second light component, and
wherein the complimentary color sheet alters the color of the second light component so that light transmitted through the complimentary color sheet and the light shielding layer is emitted therefrom with a color that is substantially similar to the color of the first light component that is emitted from the light guide plate.

10. The illumination device according to claim 9, wherein the light source includes at least one light-emitting diode emitting white light and mounted on a package.

11. The illumination device according to claim 10, wherein the color of the first light component is white light, and the second light component varies from white light after being transmitted through at least a portion of the package.

12. The illumination device according to claim 9, wherein the light source is positioned adjacent to an edge of the light guide plate, and the optical element is positioned above the light source.

13. The illumination device according to claim 12, wherein the light source includes a plurality of light-emitting diodes emitting white light that are arranged along the edge of the light guide plate.

14. The illumination device according to claim 13, wherein the complimentary color sheet includes a plurality of discrete portions corresponding to each of the plurality of light-emitting diodes, each portion positioned above the respective light-emitting diode.

15. The illumination device according to claim 12, further comprising a plurality of light sources, light guide plates and optical elements that are arranged in a two-dimensional array.

16. The illumination device according to claim 12, wherein one optical element is common to at least two adjacent light guide plates.

17. The illumination device according to claim 9, wherein the light source includes a plurality of light-emitting portions, each portion positioned adjacent to a different edge of the light guide plate.

18. The illumination device according to claim 17, wherein an optical element is positioned above each of the light-emitting portions.

19. The illumination device according to claim 18, wherein each light-emitting portion includes a plurality of light-emitting diodes emitting white light.

20. A display device comprising:
a liquid crystal panel; and
an illumination device configured to illuminate the liquid crystal panel, the illumination device including
an array of light guide plates,
a plurality of light sources arranged at one or more edges of each of the light guide plates, and
optical elements positioned above at least a portion of the light sources, at least one optical element including a complimentary color sheet, and a light shielding layer provided on the complimentary color sheet,
wherein at least one light source emits a first light component into the respective light guide plate and emits a second light component into the respective optical element, the second light component varies from white light and has a different color than the first light component,
wherein the complimentary color sheets have a color that is complimentary to the color of the second light component, and
wherein at least one complimentary color sheet alters the color of the second light component to reduce a difference between the color of the second light component and white light as the second light component is transmitted through the complimentary color sheet and the light shielding layer.

21. The display device according to claim 20, wherein at least one optical element is common to a plurality of light sources.

22. The display device according to claim 20, wherein at least one optical element is common to a plurality of light guide plates.

23. The display device according to claim 22, wherein the optical element that is common to a plurality of light guide plates has a stripe shape and is positioned at a boundary between adjacent rows or columns of light guide plates.

24. The display device of claim 20, wherein the color of the second light component has a yellowish tint, and a color of the complimentary color sheet is blue.

25. The display device of claim 20,
wherein a first light source includes a plurality of light-emitting diodes and is positioned at a first edge of a first light guide plate, and a second light source includes a plurality of light-emitting diodes and is positioned at a second edge of a second light guide plate that is adjacent to the first light guide plate, and
wherein the first and second light sources are positioned adjacent to one another between the adjacent first and second light guide plates, and emit light in opposite directions into their respective light guide plates.

26. The display device of claim 25, wherein one optical element is common to at least the first and second light sources.

* * * * *